United States Patent [19]

Nonomura et al.

[11] 4,281,324

[45] Jul. 28, 1981

[54] MATRIX TYPE LIQUID CRYSTAL DISPLAY

[75] Inventors: Keisaku Nonomura; Toshiaki Takamatsu, both of Nara; Hisashi Uede; Tomio Wada, both of Yamatokoriyama, all of Japan

[73] Assignee: Sharp Kabushiki Kaisha, Osaka, Japan

[21] Appl. No.: 955,318

[22] Filed: Oct. 27, 1978

[30] Foreign Application Priority Data

Oct. 31, 1977 [JP] Japan .................. 52/131370

[51] Int. Cl.³ .......................... G08B 5/36
[52] U.S. Cl. .................. 340/784; 340/812; 350/333
[58] Field of Search ............ 340/784, 765, 812; 350/331, 332, 333

[56] References Cited

U.S. PATENT DOCUMENTS

| | | | |
|---|---|---|---|
| 3,848,247 | 11/1974 | Sherr ............................. | 340/765 X |
| 3,955,187 | 5/1976 | Bigelow ......................... | 340/784 |
| 3,982,239 | 9/1976 | Sherr ............................. | 340/765 X |
| 4,040,719 | 8/1977 | Schiebelhuth ................. | 340/784 X |
| 4,044,346 | 8/1977 | Akahane et al. .............. | 340/765 |

*Primary Examiner*—David L. Trafton
*Attorney, Agent, or Firm*—Birch, Stewart, Kolasch & Birch

[57] ABSTRACT

In a method for driving row electrodes (or column electrodes) of a matrix type liquid crystal display panel having a predetermined number of the row electrodes and a predetermined number of the column electrodes, different drive voltages are supplied to the row electrodes or the column electrodes so as to assure, the highest contrast despite different viewing or displaying positions.

1 Claim, 9 Drawing Figures

4,281,324

MATRIX TYPE LIQUID CRYSTAL DISPLAY

BACKGROUND OF THE INVENTION

The present invention relates to a drive circuit for a matrix type liquid crystal display providing a visual display of characters, patterns or the like.

A scheme of circuit construction for driving a matrix type liquid crystal display by a line sequential scanning method is illustrated in FIG. 1. Data contained within a master memory 1 is converted into display pattern signals via a character signal converter 2, stored temporarily within a buffer memory in a column driver 3 and then supplied to column electrodes $Y_1, Y_2, \ldots Y_n$ of a matrix type liquid crystal display 6. There is further provided a row driver 4 which scans row lines $X_1, X_2, \ldots X_m$ of the matrix type liquid crystal display 6 one by one. A control circuit 5 provides all controls for the master memory 1, the column driver 3 and the row driver 4.

With such a matrix type liquid crystal display driven by the row sequential scanning method, the greater the number of the row electrodes the shorter a period of time of voltage applied per row with respect to a full scanning period, in other words, the so-called duty factor is reduced, presenting a crosstalk problem. This is critical particularly for a liquid crystal display having the inherent properties of a threshold level that is not well defined and a response that is too slow. This results in an insufficient contrast in the liquid crystal display.

Some approaches to resolve this problem have been suggested, for example, to modify a matrix electrode structure so as to increase the duty factor. As seen from FIG. 2 showing an equivalent circuit of the electrode structre, one way is to cause one row electrode $X_i$ to confront two independent column electrodes $Y_{1j}, Y_{2j}$, thereby doubling, of quadrupling, ... the number of energizable rows without deteriorating a display contrast. It seems possible to develop a matrix type liquid crystal display having as many as 100 rows.

Nevertheless, while a twisted nematic field effect mode liquid crystal display (referred to as "TN-FEM-LCD" hereinafter) can be used with a matrix drive and will assume a comparatively good contrast when viewed from a specific direction, it is disadvantageous in that variations in the viewing direction cause a reduction in contrast and difficulties in recognizing a visual display thereof. For the planar type display, the viewing angle differs to a great extent from the top of the bottom, viz., $\theta$, and $\theta_2$, with the resulting difference in contrast from the top to the bottom.

It is therefore an object of the present invention to provide a drive circuit which overcomes the shortcomings with the prior art device, with the feature that a drive voltage is varied in accordance with scanning electrodes in practising the row sequential scanning method.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings, and wherein.

DETAILED DESCRIPTION OF THE INVENTION

A practical drive method embodying the present invention will be now described together with some performance characteristics and a driver circuit arrangement.

Figure 1:
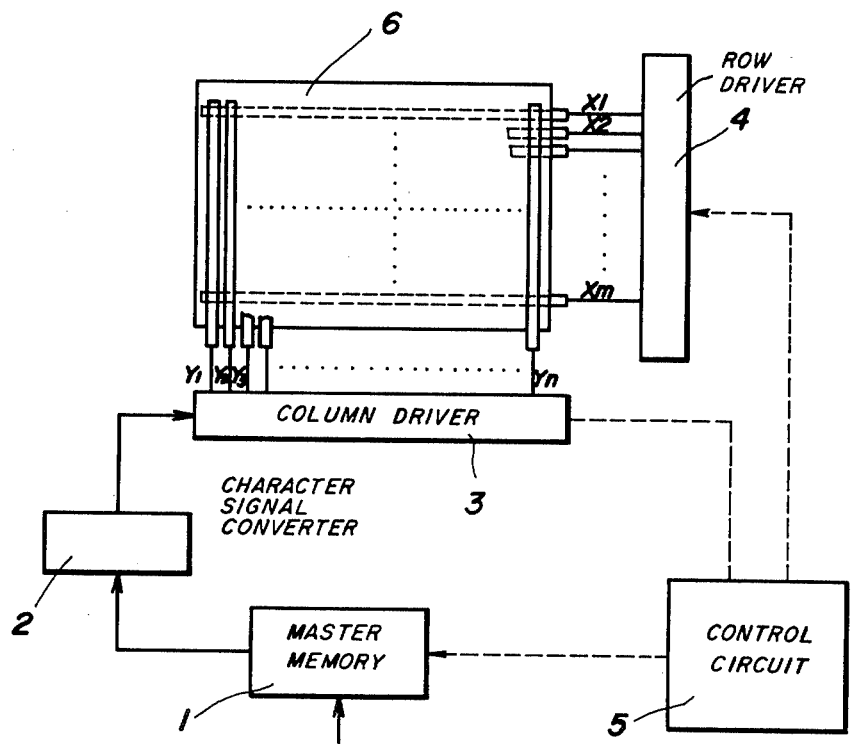
FIG. 1 is a circuit diagram of a driver circuit for a matrix type liquid crystal display.
Figure 2:
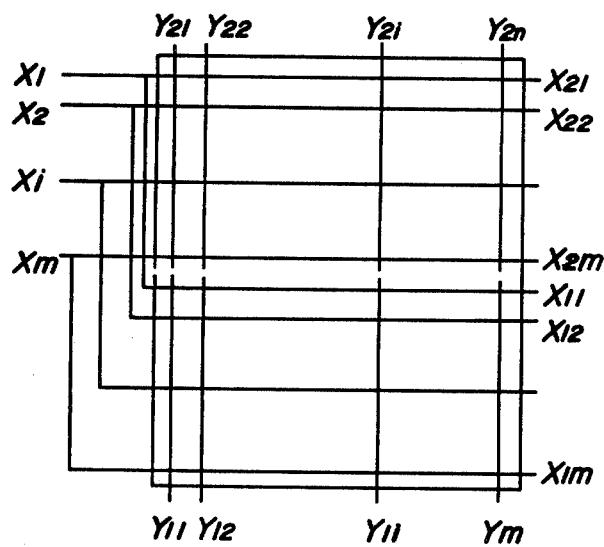
FIG. 2 is a graphical representation of an example of a matrix electrode structure.
Figure 3:
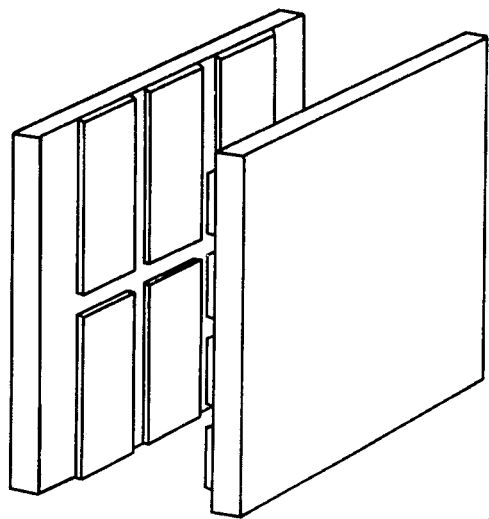
FIG. 3 is an exploded perspective view of an upper and lower divided matrix electrode structure.
Figure 4:
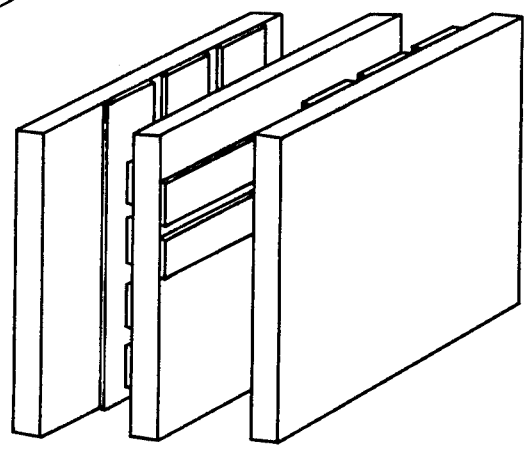
FIG. 4 is an exploded perspective view of a two layer matrix electrode structure.
Figure 5:
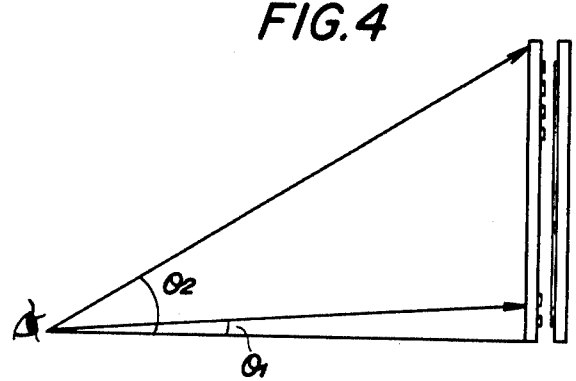
FIG. 5 is a graph showing the relationship between displaying positions and viewing angle.

There are two possible methods of using the matrix type liquid crystal display having the electrode equivalent circuit of FIG. 2. As shown in FIG. 3, one of the two methods is an upper and lower dividing type wherein each of column electrode is divided into the upper half and lower half within the cell structure. This produces upper and lower half cells or panel portions. As shown in FIg. 4, the other method is a two layer matrix type wherein two cells are provided in a stack.

While the present invention will be described in terms of the upper and lower dividing type, it is obvious that the present invention is really applicable to the two layer matrix type or the combined type thereof.

Figure 6:
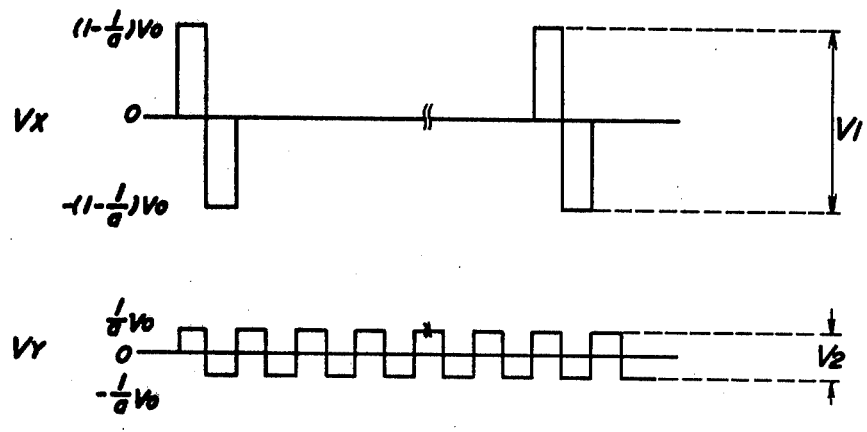
FIG. 6 is a waveform diagram of drive voltages applied to the matrix electrode according to the present invention.

In matrix driving the liquid crystal display, a 1/n bias drive method which is developed from a well known ⅓ bias method is employed. As best seen from FIG. 6, a row electrode or an X electrode is supplied with $$\pm \left(1 - \frac{1}{a}\right) V_0$$

when selected and O when non-selected while a column electrode or a Y electrode is always supplied with $\pm 1/a$ $V_0$, so that the voltage across the X and Y electrodes is $V_o$ when selected and $\pm 1/a\, V_0$ when non-selected. Therefore, an operating margin $\alpha = V_{ON}/V_{OFF}$ is maximized wherein $a = \sqrt{N} + 1$ and N is the number of scanning lines.

Figure 7:
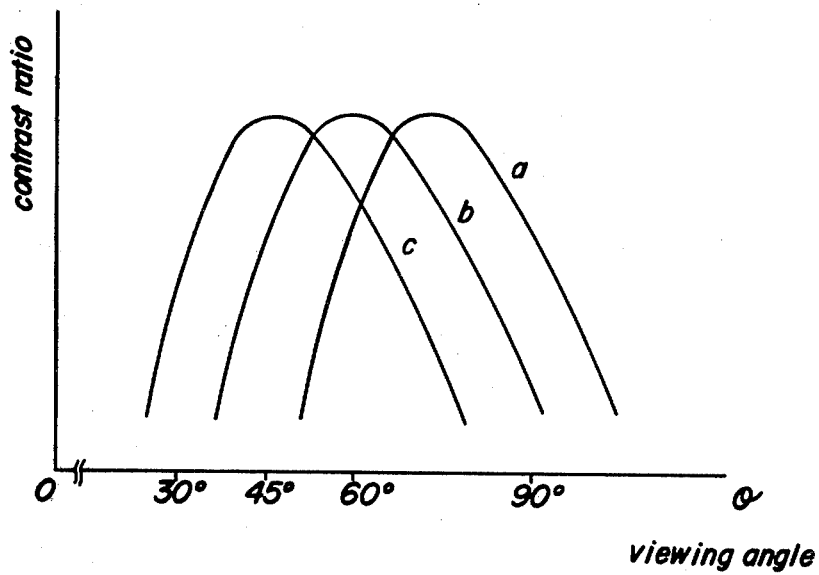
FIG. 7 is a graph showing the relationship between viewing angles and contrasts while taking as a function of the drive voltage under the condition that an operating margin is substantially a maximum.

This implies that the operating margin is maximized as far as the relashinship $V_1 = \sqrt{N}.V_2$ is satisfied wherein $V_1$ is a peak to peak voltage of a $V_X$ signal and $V_2$ is the counterpart of a $V_Y$ signal. As the absolute values of $V_1$ and $V_2$ are varied while satisfying the above relationship, a constant ratio between respective viewing angles will be varied. FIG. 7 shows viewing characteristics wherein a contrast ratio is plotted as a function of a viewing angle $\theta$. The curve ⓐ of FIG. 7 shows a contrast ratio where drive voltages $V_{11}$ and $V_{12}$ are established in the following relationship:

$$V_{11} = \sqrt{N} \cdot V_{21}$$

The curve (b) shows the case where drive voltages $V_{12}$ and $V_{22}$ are correlated:

$$V_{12} = \sqrt{N} \cdot V_{22}$$

The curve (c) shows the case where drive voltages $V_{13}$ and $V_{23}$ are correlated:

$$V_{13} = \sqrt{N} \cdot V_{23}$$

In other words,
$V_{11} > V_{12} > V_{13}$
$V_{21} > V_{22} > V_{23}$

Analysis of these experimental results revealed that, while variations in drive voltage cause less or no variations in the range of viewing angles having a suitable contrast ratio, the viewing angle $\theta$ where the highest contrast is available is in positive correlation with the drive voltage V.

Figure 8:
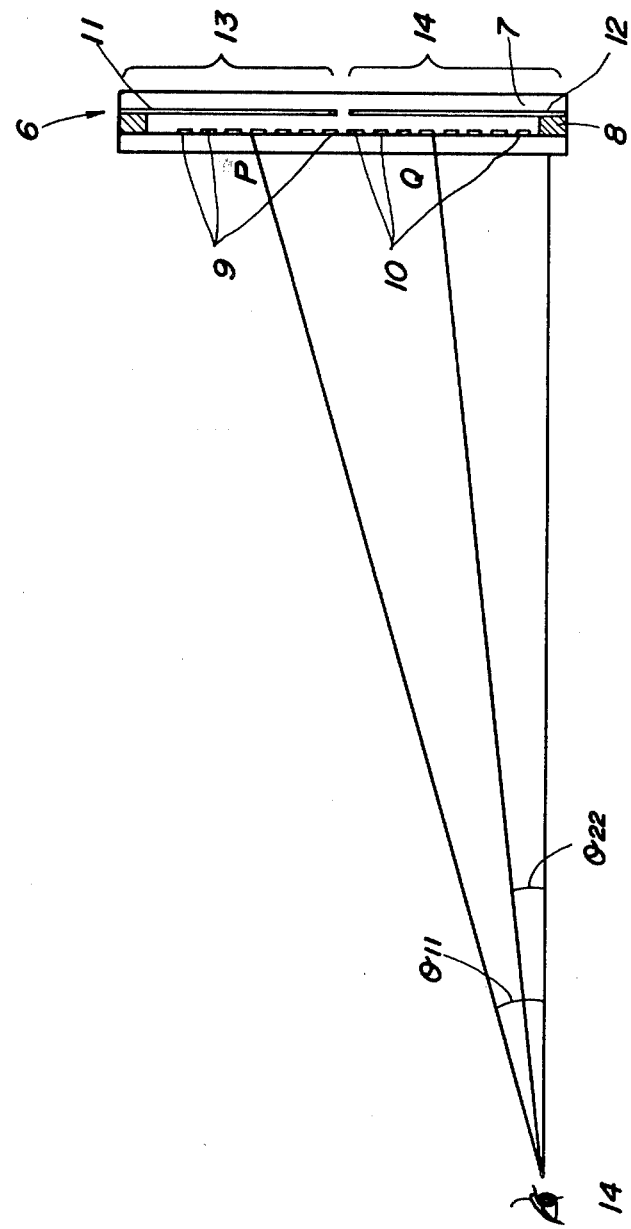
FIG. 8 shows one preferred form of the present invention.
Figure 9:
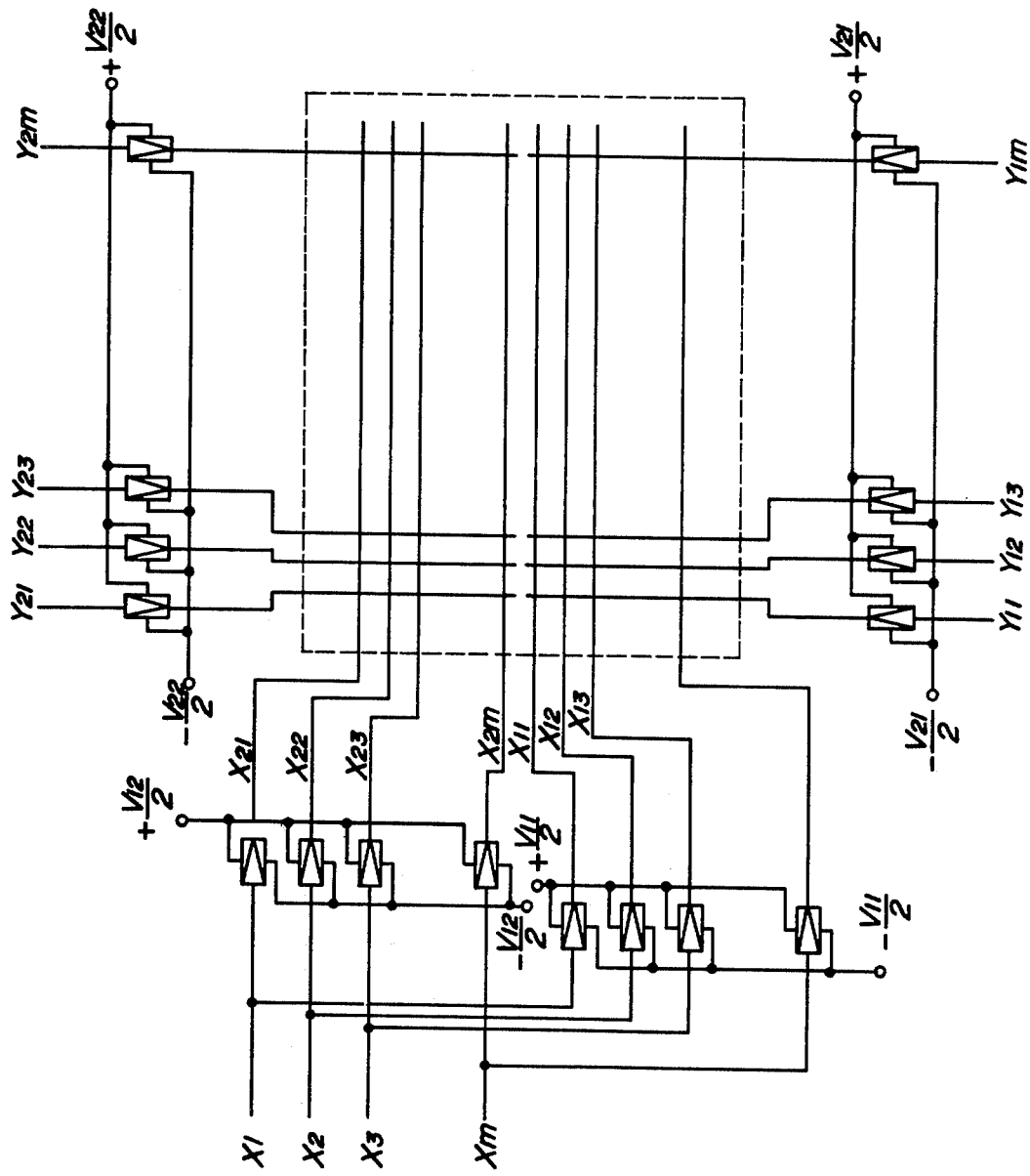
FIG. 9 is a circuit diagram of an electrode driver circuit in the above illustrated embodiment.

To this end, according to one preferred embodiment of the present invention, a single display unit is divided into the upper half and lower half as shown in FIG. 8 and a driver circuit arrangement is set up as shown in FIG. 9. The drive voltages $V_{12}$ and $V_{22}$ to be applied to the X electrode group 9 and the Y electrode group 11 of the upper half cell 13 are selected so as to develop the highest contrast with the viewing angle $\theta_{11}$ toward a middle point P in the upper half cell. Similarly, the drive voltages $V_{11}$ and $V_{12}$ to the X electrode group 10 and the Y electrode group 12 of the lower half cell 14 are selected so as to develop the highest contrast ratio with the viewing angle $\theta_{22}$ toward another middle point Q in the lower half cell. This eliminates non-uniformity in contrast ratio throughout the display panel as is of the case where the dimension of the display panel is halved.

This upper and lower separate drive method, of course, is applicable to the upper and lower dividing matrix of FIG. 3. In the case where the two layer matrix is combined with the upper and lower dividing type, it is also possible to realize the highest contrast ratio by quartering the display panel and changing the drive voltages to the respective quarters thereof. This leads to the display panel free of nonuniformity in contrast due to different displaying positions. It is obvious that the present invention is useful within a wide range covering from a hand held type display to a floor type.

The invention being thus described, it will be obvious that the same may be varied in many ways. Such modifications are not to be regarded as a departure from the spirit and scope of the invention, and all such modifications are intended to be included within the scope of the following claims.

What is claimed is:

1. A matrix type liquid crystal display panel system comprising:
    a matrix type liquid crystal display panel having matrix electrodes, said liquid crystal display panel having at least a first panel portion and a second panel portion; and
    driving means for line scanning said matrix type liquid crystal display panel, said driving means supplying said first panel portion and said second panel portion with different drive voltages, the drive voltage applied to said first panel portion being selected to develop substantially the highest contrast as perceived by a viewer viewing said display panel with a viewing angle toward a middle point in the first panel portion, the drive voltage applied to the second panel portion being selected to develop substantially the highest contrast as perceived by a viewer viewing said display panel with a viewing angle toward a middle point in said second panel portion different from the viewing angle toward said first panel portion.

* * * * *